United States Patent
Reinartz et al.

(10) Patent No.: US 11,851,574 B2
(45) Date of Patent: Dec. 26, 2023

(54) SOLVENT-FREE COMPOSITION BASED ON 2,4,7,9-TETRAMETHYL-5-DECYNE-4,7-DIOL

(71) Applicant: Evonik Operations GmbH, Essen (DE)

(72) Inventors: Roger Reinartz, JG Best (NL); Kenneth Michael Peck, Emmaus, PA (US); Petra Hinrichs, Bochum (DE)

(73) Assignee: Evonik Operations GmbH, Essen (DE)

( * ) Notice: Subject to any disclaimer, the term of this patent is extended or adjusted under 35 U.S.C. 154(b) by 255 days.

(21) Appl. No.: 17/172,348

(22) Filed: Feb. 10, 2021

(65) Prior Publication Data

US 2021/0253896 A1 Aug. 19, 2021

(30) Foreign Application Priority Data

Feb. 14, 2020 (EP) .................... 20157331

(51) Int. Cl.
*C09D 171/08* (2006.01)
*C09D 7/45* (2018.01)
*C09K 23/42* (2022.01)
*C09K 23/38* (2022.01)

(52) U.S. Cl.
CPC ............ *C09D 171/08* (2013.01); *C09D 7/45* (2018.01); *C09K 23/38* (2022.01); *C09K 23/42* (2022.01)

(58) Field of Classification Search
CPC .......... C09D 171/08; C09D 7/45; C09D 7/40; C09D 11/38; C09D 11/03; C09D 7/63; C09D 7/65; C08L 71/02; C08K 5/053; C09K 23/00
See application file for complete search history.

(56) References Cited

U.S. PATENT DOCUMENTS

| | | | |
|---|---|---|---|
| 7,018,963 B2 | 3/2006 | Mizusaki et al. | |
| 2003/0125393 A1* | 7/2003 | Nakamura | C09D 17/004 516/78 |
| 2019/0177859 A1* | 6/2019 | Arai | C23F 11/145 |
| 2021/0277331 A1 | 9/2021 | Suzuki et al. | |
| 2022/0073765 A1 | 3/2022 | Hinrichs et al. | |

FOREIGN PATENT DOCUMENTS

| | | |
|---|---|---|
| EP | 0 618 000 | 10/1994 |
| JP | 2003-253599 | 9/2003 |

OTHER PUBLICATIONS

BioPharma PEG11 (Year: 2023).*
European Search Report dated Jul. 31, 2020 in European Application No. 20157331.8.
U.S. Appl. No. 17/414,497, filed Jun. 16, 2021, 2022/0073765, Hinrichs et al.

* cited by examiner

*Primary Examiner* — Robert S Jones, Jr.
*Assistant Examiner* — Jiangtian Xu
(74) *Attorney, Agent, or Firm* — Grüneberg and Myers PLLC

(57) ABSTRACT

A solvent-free composition contains the following components: 2,4,7,9-tetramethyl-5-decyne-4,7-diol, ethoxylates thereof, and polyethylene glycols, wherein the composition contains water and wherein the concentration of 2,4,7,9-tetramethyl-5-decyne-4,7-diol is greater than 40% by weight, based on the composition.

18 Claims, No Drawings

SOLVENT-FREE COMPOSITION BASED ON 2,4,7,9-TETRAMETHYL-5-DECYNE-4,7-DIOL

CROSS-REFERENCE TO RELATED APPLICATIONS

This application claims priority to European patent application 20157331.8 filed Feb. 14, 2020, incorporated herein by reference.

BACKGROUND OF THE INVENTION

Field of the Invention

The invention relates to a solvent-free composition based on 2,4,7,9-tetramethyl-5-decyne-4,7-diol, to the use thereof and production thereof, in order to reduce the surface tension in aqueous and solvent-containing systems.

Description of Related Art

The ability to lower surface tension is of major importance in applications of formulations based on water since reduced surface tension has an effect on improved substrate wetting. Examples of such compositions based on water include coatings, inks, moistening agents, cleaning compositions and agricultural formulations. Surface tension reduction in systems based on water is generally achieved by adding surface-active substances, resulting in improved surface wetting, fewer defects and better levelling. The reduction of the static surface tension is important if the system is at rest. The dynamic surface tension provides a measure of the ability of a surface-active substance to orient on a newly created surface.

Surface-active additives based on acetylenic glycols, such as 2,4,7,9-tetramethyl-5-decyne-4,7-diol, are known for their good static and dynamic surface tension reduction capabilities with few of the negative features of conventional non-ionic and anionic surface-active additives.

The additive 2,4,7,9-tetramethyl-5-decyne-4,7-diol is a waxy solid with low water solubility and volatility and is available, for example, under the trade name SURFYNOL® 104 (Evonik). Before the additive can be used as, for example, a wetting agent, it must therefore be melted and/or additionally be dissolved in an organic solvent at the preferred use concentration of approx. 50%. These additional process steps mean more effort and costs for the user in the paint industry.

In order to avoid these additional process steps, there are already products on the market in which 2,4,7,9-tetramethyl-5-decyne-4,7-diol is dissolved in suitable organic solvents, such as 2-ethylhexanol, 2-butoxyethanol, dipropylene glycol monomethyl ether, ethylene glycol, propylene glycol or 2-propanol, at the desired solution concentration of 50% or 75%. Known trade names here are, e.g. Surfynol® 104 A or SURFYNOL® 104 E.

For the utilization of organic solvents in coating compositions or formulations, marked restrictions are to be expected in the future. These arise, inter alia, from various national and international guidelines (EU Decopaint guideline 2004/42/CE) for limitation of VOC (volatile organic compound) emissions from coating materials and for reduction of the health risk to the processor and user by volatile and semi-volatile compounds (VOCs and SVOCs) (see demands of the Ausschuss für die gesundheitliche Bewertung von Bauprodukten=AgBB [German Committee for Health-related Evaluation of Building Products]) or the certification of buildings according to the Deutsche Gesellschaft für Nachhaltiges Bauen e.V. (DGNB) [German Sustainable Building Council] or Leadership in Energy & Environmental Design (LEED).

U.S. Pat. No. 7,018,963 discloses comparative tests of a water-soluble wetting agent composition consisting of 2,4,7,9-tetramethyl-5-decyne-4,7-diol and an alcohol alkoxylate or ethoxylated 2,4,7,9-tetramethyl-5-decyne-4,7-diol with an alcohol alkoxylate and ethylene glycol (Table 1), with no information on the storage stability.

SUMMARY OF THE INVENTION

Therefore, it is the object of the invention to provide a composition, inter alia, as a wetting agent and/or defoamer, which is essentially free from volatile organic compounds compared to comparable compositions and which is storage-stable.

To achieve the object, therefore, a solvent-free composition is proposed comprising the following components
2,4,7,9-tetramethyl-5-decyne-4,7-diol,
ethoxylates thereof and
polyethylene glycols,
wherein said composition comprises water and the concentration of 2,4,7,9-tetramethyl-5-decyne-4,7-diol is greater than 40% by weight, based on the composition.

The present invention includes the following embodiments below:

1. Solvent-free composition comprising the following components
   2,4,7,9-tetramethyl-5-decyne-4,7-diol,
   ethoxylates thereof and
   polyethylene glycols,
   characterized in that said composition comprises water and the concentration of 2,4,7,9-tetramethyl-5-decyne-4,7-diol is greater than 40% by weight, based on the composition.
2. Composition according to embodiment 1, characterized in that the composition does not comprise any organic solvent.
3. Composition according to either of the preceding embodiments, characterized in that the concentration of 2,4,7,9-tetramethyl-5-decyne-4,7-diol is not greater than 80% by weight, preferably not greater than 70% by weight, particularly preferably not greater than 60% by weight, based on the composition.
4. Composition according to any of the preceding embodiments, characterized in that the polyethylene glycols have a molar mass of 200 g/mol-1000 g/mol, preferably 300 g/mol-800 g/mol, particularly preferably 400 g/mol-600 g/mol.
5. Composition according to any of the preceding embodiments, characterized in that the ethoxylates of 2,4,7,9-tetramethyl-5-decyne-4,7-diol comprise 1 to 10 mol, preferably 3 to 10 mol of ethylene oxide.
6. Composition according to any of the preceding embodiments, characterized in that said composition comprises
   40-80% by weight, preferably 41-70% by weight, particularly preferably 42-60% by weight 2,4,7,9-tetramethyl-5-decyne-4,7-diol,
   0.5-15% by weight, preferably 1.0-10.0% by weight, particularly preferably 2.0-8.0% by weight ethoxylates of 2,4,7,9-tetramethyl-5-decyne-4,7-diol,
   35-55% by weight, preferably 38-50% by weight, particularly preferably 40-45% by weight polyethylene glycols and 1.0-15% by weight, preferably 2.0-12.0% by weight, particularly preferably 3.0-10.0% by weight water,
wherein the stated amounts of the components add up to 100% by weight and are based on the composition.
7. Use of a composition according to any of the preceding embodiments as a wetting agent, as a defoamer or as a dispersing aid in coating compositions.
8. Use of a composition according to any of the preceding embodiments in formulations of lacquers, paints, inks, aids in the fields of agriculture, construction materials, plant protection, textile finishing, hydrophobizing and electroplating, latex dipping processes, metalworking fluids and printed circuit board coatings.
9. Process for producing the composition according to any of embodiments 1-6, comprising the following steps:
   a. providing a polyethylene glycol,
   b. adding water,
   c. adding ethoxylates of 2,4,7,9-tetramethyl-5-decyne-4,7-diol,
   d. adding molten 2,4,7,9-tetramethyl-5-decyne-4,7-diol.

DETAILED DESCRIPTION OF THE INVENTION

In the context of this invention, solvent-free signifies that no solvents are used which comprise volatile organic compounds in accordance with the requirements of EU Decopaint guideline 2004/42/CE.

The composition according to the invention preferably does not comprise any organic solvents such as 2-ethylhexanol, 2-butoxyethanol, dipropylene glycol monomethyl ether, ethylene glycol, propylene glycol or 2-propanol.

Surprisingly, therefore, 2,4,7,9-tetramethyl-5-decyne-4,7-diol could be dissolved in water such that the use of organic solvents could be dispensed with.

Completely unexpectedly, the composition according to the invention exhibits no phase separation in storage stability tests, even under extreme temperature fluctuations after thawing. Any crystals formed during storage stability tests can be readily reincorporated, i.e. without high shear forces and/or heating.

The composition according to the invention preferably has a concentration of 2,4,7,9-tetramethyl-5-decyne-4,7-diol not greater than 80% by weight, preferably not greater than 70% by weight, particularly preferably not greater than 60% by weight, based on the composition.

It was also completely unexpected that this concentration of 2,4,7,9-tetramethyl-5-decyne-4,7-diol could be adjusted. Without changing the formulation, the user can use the solvent-free composition according to the invention.

The polyethylene glycols preferably have a molar mass of 200 g/mol-1000 g/mol, preferably 300 g/mol-800 g/mol, particularly preferably 400 g/mol-600 g/mol.

The composition according to the invention preferably comprises ethoxylates of 2,4,7,9-tetramethyl-5-decyne-4,7-diol, 1 to 10, preferably 3 to 10 mol of ethylene oxide. These are known, for example, under the product names SURFYNOL® 465, SURFYNOL® 440 or SURFYNOL® 420 (Evonik).

The ethoxylated derivatives or ethoxylates of 2,4,7,9-tetramethyl-5-decyne-4,7-diol are used synonymously here.

According to a preferred embodiment of the composition according to the invention, said composition comprises
40-80% by weight, preferably 41-70% by weight, particularly preferably 42-60% by weight 2,4,7,9-tetramethyl-5-decyne-4,7-diol,
0.5-15% by weight, preferably 1.0-10.0% by weight, particularly preferably 2.0-8.0% by weight ethoxylates of 2,4,7,9-tetramethyl-5-decyne-4,7-diol,
35-55% by weight, preferably 38-50% by weight, particularly preferably 40-45% by weight polyethylene glycols and
1.0-15% by weight, preferably 2.0-12.0% by weight, particularly preferably 3.0-10.0% by weight water,
wherein the stated amounts of the components add up to 100% by weight and are based on the composition.

The invention further relates preferably to the use of the composition according to the invention as a wetting agent, as a defoamer or as a dispersing aid in coating compositions Coating compositions can be used in the field of lacquers, paints and inks.

The composition according to the invention can be used by way of preference in formulations of aids in the fields of agriculture, construction materials, plant protection, textile finishing, hydrophobizing and electroplating, latex dipping processes, metalworking fluids and printed circuit board coatings.

The invention also relates to the process for producing the composition with the following steps:
a. providing a polyethylene glycol,
b. adding water,
c. adding ethoxylates of 2,4,7,9-tetramethyl-5-decyne-4,7-diol,
d. adding molten 2,4,7,9-tetramethyl-5-decyne-4,7-diol.

By following these steps, it was possible to establish that 2,4,7,9-tetramethyl-5-decyne-4,7-diol could be better incorporated without fearing a reduction of the concentration in the composition according to the invention, for example by adhesion of the same to the vessel. With regard to industrial production of the composition according to the invention, the reduction of 2,4,7,9-tetramethyl-5-decyne-4,7-diol would be far more serious than in the laboratory scale.

The composition according to the invention therefore provides many advantages. It is storage-stable and can be readily incorporated in aqueous formulations and water. Systems produced therefrom have a low surface tension and have reduced foaming behaviour.

With respect to the freedom from solvents comprising volatile organic compounds, the composition according to the invention represents a VOC-reduced and/or quasi VOC-free composition.

The examples which follow are provided merely to elucidate this invention to those skilled in the art and do not constitute any limitation of the described subject matter or of the described process whatsoever.

EXAMPLES

Instruments
  circulating air oven from Binder
  dissolver/cog disk from VMA Getzmann, type CA20M1
1. Preparation of the Compositions
Firstly, SURFYNOL® 104 (Evonik) was melted in a circulating air oven at 60° C. PEG 400 (Dow) was initially charged in a 180 ml plastic beaker. Water was added slowly with stirring at 500 revolutions per minute (rpm) and stirred in with a cog disk (Ø4 cm) and further stirred for 5 minutes. Subsequently, the SURFYNOL® 440 (Evonik) was added with stirring and finally the previously melted SURFYNOL® 104. The composition was then stirred at 500 rpm for a further 15 minutes.

The % by weight of the components are evident in Table 1.

2. Storage Stability Experiments

Diverse experiments were conducted in order to test the storage stability of the composition according to the invention. For this purpose, different conditions were simulated which could prevail on storage of the composition.

2a) At Room Temperature

The compositions prepared were assessed visually after one day and after one week at room temperature. The visual results are presented in Table 1.

Inventive compositions Z1 and Z2 were clear and liquid after one day and after one week.

Comparative compositions VZ1 and VZ2 demonstrate the low solubility of SURFYNOL® 104 in water, which is known from the prior art.

Comparative compositions VZ3-VZ6 demonstrate that SURFYNOL® 104 is insoluble in PEG 400 at a concentration of >40% by weight.

Comparative compositions VZ7 and VZ8 could be converted to a liquid state by use of water. However, VZ8 showed phase separation and is also partially solid after one week. VZ7 appeared to be storage stable even without addition of SURFYNOL® 440, but which was disproved by further experiments (see below).

2b) At −5° C. Over 1-4 Days with Subsequent 5 Hours' Thawing

The compositions produced were stored at −5° C. and in each case visually assessed after one day and then thawed for 5 hours (h) after the 4th day and finally assessed. The results are listed in Table 2.

For this experiment, only VZ1, VZ2, VZ7 and Z1, Z2 were selected since they were considered to be suitable under "mild" conditions, as described under 2a). The other comparative compositions were no longer considered since they were not storage-stable.

It was shown here that VZ7 was not stable at a temperature of −5° C. over a short period (4 days).

The inventive compositions Z1 and Z2 and also VZ1 were stable under these conditions.

2c) Under Extreme Conditions

The compositions produced were stored for 4 days in a cycle of 16 hours at −20° C. and then thawed for 8 hours at room temperature (RT). After each step, they were visually examined. The results are presented in Table 3.

The same compositions as in 2b) were selected for this experiment.

It has been demonstrated that the inventive compositions Z1 and Z2 are stable even under these extreme conditions. In the case of VZ1, the user had to thaw the composition. The waiting period for thawing does not have to be observed in the case of the inventive compositions. The user thus saves time and therefore also costs.

TABLE 1

| Compositions | SURFYNOL® 104 | PEG 400 | Water | SURFYNOL® 440 | After 1 day Visual assessment | After 1 week Visual assessment |
|---|---|---|---|---|---|---|
| VZ1 | 0.1 | | 99.9 | | Clear, oil droplets on the surface | Clear, liquid |
| VZ2 | | | 99 | | Clear, liquid, clumps on the surface | Clear, liquid, clumps on the surface |
| VZ3 | 40 | 60 | | | Solid | Solid |
| VZ4 | 45 | 55 | | | Partially solid, phase separation | Partially solid, phase separation |
| VZ5 | 50 | 50 | | | Solid | Solid |
| VZ6 | 75 | 25 | | | Solid | Solid |
| VZ7 | 50 | 40 | 10 | | Clear, liquid | Clear, liquid |
| VZ8 | 50 | 30 | 20 | | Liquid, phase separation | Partially solid, phase separation |
| Z1 | 45 | 40 | 10 | 5 | Clear, liquid | Clear, liquid |
| Z2 | 50 | 36 | 9 | 5 | Clear, liquid | Clear, liquid |

TABLE 2

| Compositions | Day 1/−5° C. | Day 2/ −5° C. | Day 3/ −5° C. | Day 4/ −5° C. | Day 4, after thawing/5 h |
|---|---|---|---|---|---|
| VZ1 | Liquid, no clumps | Solid | Solid | Solid | Clear, liquid |
| VZ2 | Liquid, larger clumps | Solid | Solid | Solid | Cloudy, liquid |
| VZ7 | Liquid, some crystal formation | Increasing crystal formation over time | | | Slushy, crystal formation; Crystals could not be reincorporated by gentle stirring at room temperature |
| Z1 | Liquid, clear | Liquid, clear, slight increase in crystal formation over time | | | Liquid, clear, a few crystals on the surface; Can be reincorporated by gentle stirring at room temperature |
| Z2 | Liquid, clear | | | | Liquid, clear, a few crystals on the surface; Can be reincorporated by gentle stirring at room temperature |

TABLE 3

| | Day 1 | | Day 2 | | Day 3 | | Day 4 | |
|---|---|---|---|---|---|---|---|---|
| | 16 h/−20° C. | 8 h/RT | 16 h/−20° C. | 8 h/RT | 16 h/−20° C. | 8 h/RT | 16 h/−20° C. | 8 h/RT |
| VZ1 | Solid | Clear, liquid | Solid | Clear, liquid | Solid | Clear, liquid | Solid | Clear, liquid |
| VZ2 | Solid | Clear, liquid, clumps on the surface | Solid | Clear, liquid, clumps on the surface | Solid | Liquid, phase separation, clumps | Solid | Liquid, phase separation, clumps |
| VZ7 | Clear, liquid | Liquid, crystal formation | Solid | Liquid, crystal formation greater than on Day 1 | Solid | Liquid, crystal formation greater than on Day 2 | Solid | Phase separation, crystals could not be incorporated by gentle stirring at room temperature |
| Z1 | Clear, liquid | Clear, liquid | Clear, liquid | Clear, liquid | Clear, liquid | Clear, liquid | Clear, liquid | Clear, liquid |
| Z2 | Clear, liquid | Clear, liquid | Clear, liquid | Clear, liquid | Clear, liquid | Clear, liquid | Clear, liquid | Clear, liquid |

The invention claimed is:

1. A solvent-free composition, comprising:
2,4,7,9-tetramethyl-5-decyne-4,7-diol,
ethoxylates thereof, and
polyethylene glycols,
wherein said composition comprises water and a concentration of 2,4,7,9-tetramethyl-5-decyne-4,7-diol greater than 40% by weight, based on the weight of the composition, and
wherein the composition comprises 35-55% by weight of polyethylene glycols.

2. A composition, comprising:
2,4,7,9-tetramethyl-5-decyne-4,7-diol,
ethoxylates thereof, and
polyethylene glycols,
wherein said composition comprises water and a concentration of 2,4,7,9-tetramethyl-5-decyne-4,7-diol greater than 40% by weight, based on the weight of the composition,
wherein the composition does not comprise any organic solvent, and
wherein the composition comprises 35-55% by weight of polyethylene glycols.

3. The composition according to claim 1, wherein the concentration of 2,4,7,9-tetramethyl-5-decyne-4,7-diol is not greater than 80% by weight, based on the weight of the composition.

4. The composition according to claim 1, wherein the polyethylene glycols have a molar mass of 200 g/mol-1000 g/mol.

5. The composition according to claim 1, wherein the ethoxylates of 2,4,7,9-tetramethyl-5-decyne-4,7-diol comprise 1 to 10 mol of ethylene oxide.

6. The composition according to claim 1, wherein said composition comprises:
40-80% by weight of 2,4,7,9-tetramethyl-5-decyne-4,7-diol,
0.5-15% by weight of ethoxylates of 2,4,7,9-tetramethyl-5-decyne-4,7-diol,
35-55% by weight of polyethylene glycols, and
1.0-15% by weight of water,
wherein the stated amounts of the components add up to 100% by weight and are based on the weight of the composition.

7. A method of wetting for coating compositions, the method comprising: incorporating the composition according to claim 1 into a coating composition as a wetting agent.

8. A method of formulating lacquers, paints, inks, or aids, the method comprising:
incorporating the composition according to claim 1 into a formulation of a lacquer, paint, ink, or aid,
wherein the aid is an aid in a field of agriculture, construction materials, plant protection, textile finishing, hydrophobizing and electroplating, latex dipping processes, metalworking fluids or printed circuit board coatings.

9. A process for producing the composition according to claim 1, the process comprising:
a. providing a polyethylene glycol,
b. adding water,
c. adding ethoxylates of 2,4,7,9-tetramethyl-5-decyne-4,7-diol, and
d. adding molten 2,4,7,9-tetramethyl-5-decyne-4,7-diol.

10. The composition according to claim 3, wherein the concentration of 2,4,7,9-tetramethyl-5-decyne-4,7-diol is not greater than 60% by weight, based on the weight of the composition.

11. The composition according to claim 4, wherein the polyethylene glycols have a molar mass of 400 g/mol-600 g/mol.

12. The composition according to claim 5, wherein the ethoxylates of 2,4,7,9-tetramethyl-5-decyne-4,7-diol comprise 3 to 10 mol of ethylene oxide.

13. The composition according to claim 6, wherein the composition comprises 42-60% by weight of 2,4,7,9-tetramethyl-5-decyne-4,7-diol.

14. The composition according to claim 6, wherein the composition comprises 2.0-8.0% by weight of ethoxylates of 2,4,7,9-tetramethyl-5-decyne-4,7-diol.

15. The composition according to claim 6, wherein the composition comprises 40-45% by weight of polyethylene glycols.

16. The composition according to claim 6, wherein the composition comprises 3.0-10.0% by weight of water.

17. A method of defoaming for coating compositions, the method comprising: incorporating the composition according to claim 1 into a coating composition as a defoamer.

18. A method of dispersing for coating compositions, the method comprising: incorporating the composition according to claim 1 into a coating composition as a dispersing aid.

* * * * *